Oct. 28, 1952 — M. T. RICHARDS — 2,616,004
FLUID CONTROLLED SWITCH
Filed Sept. 19, 1951 — 2 SHEETS—SHEET 1

INVENTOR
*Max T. Richards*

BY *Mason, Fenwick & Lawrence*
ATTORNEYS

Oct. 28, 1952     M. T. RICHARDS     2,616,004
FLUID CONTROLLED SWITCH

Filed Sept. 19, 1951     2 SHEETS—SHEET 2

INVENTOR
*Max T. Richards*

BY *Mason, Fenwick, & Lawrence*
ATTORNEYS

Patented Oct. 28, 1952

2,616,004

UNITED STATES PATENT OFFICE 2,616,004

FLUID CONTROLLED SWITCH

Max T. Richards, Orlando, Fla.

Application September 19, 1951, Serial No. 247,240

4 Claims. (Cl. 200—84)

This invention relates to fluid controlled switches, and more particularly to that type of switch which may be used in a circuit to warn of a low fluid level in confined spaces where the depth of the fluid container is comparatively shallow.

In the operation of hydraulic systems, especially the brake system on automobiles, a shallow container is provided as a reservoir for fluid to replace that which may seep from the hydraulic system. Because the brake fluid reservoir for automobiles is located in a place that is not easily accessible and the only opening therein is the filler cap which requires the use of a wrench to remove, the average automobile operator does not check the reserve fluid for his brake system until the brakes fail. This can, and sometimes does, result in an accident which could have beeen prevented, had the operator of the car been warned in advance that the reserve fluid was low.

While the desirability of providing a warning signal to indicate when the reserve fluid is low is well-recognized, and a number of patents have been granted on such devices, yet the provision of a sturdy reliable warning system has presented many problems. As mentioned before, by no means the least of these difficulties is the fact that the liquid level maintained in the reservoir has very little depth. The difference between a safe reserve supply and a dangerously low one is a matter of approximately one inch. Another problem is to locate the low level actuator switch so that it can be installed without the use of special tools.

Many types of float actuated devices have been known which, on first view, would seem to be suitable for operating an electric switch to turn on and off a signal light installed on the dashboard of an automobile when the reserve supply of fluid becomes too low. These consist of hollow bulbs, cork, and the like. When the problem of installation in the reservoir is overcome, there is still another problem which arises from the fact that if a floatable material is used and the reservoir is completely filled, the elements of the float switch are under a constant strain. More serious than this is the danger of saturation of the float causing it to become inoperative, or where the hollow floats are used, there is the danger of seepage into the float.

Consequently, it is an object of the present invention to provide a switch suitable for use with an electric warning signal system to indicate when the fluid level in an enclosed chamber has dropped beyond a predetermined level.

It is also an object of the present invention to provide a compact switch that may be readily installed through a small opening and which does not substantially extend beyond the perimeter of the opening, and which is readily insertable and removable.

Specifically, the invention seeks to provide a switch which operates in accordance with the level of the fluid in which it is immersed, which switch includes no floatable materials, air chambers, or the like.

These and other objects and advantages of the invention will be apparent from the following description made in connection with the accompanying drawings in which like reference characters refer to the same parts throughout the different figures, and in which.

For the purpose of illustration, applicant has elected to describe his invention in connection with an electric warning system and as it may be applied to the reservoir for the storage of fluid for the hydraulic brake system of automotive vehicles, though he by no means wishes to limit his invention to this use, as the device of this application will be found very useful for many other applications.

Figure 1:
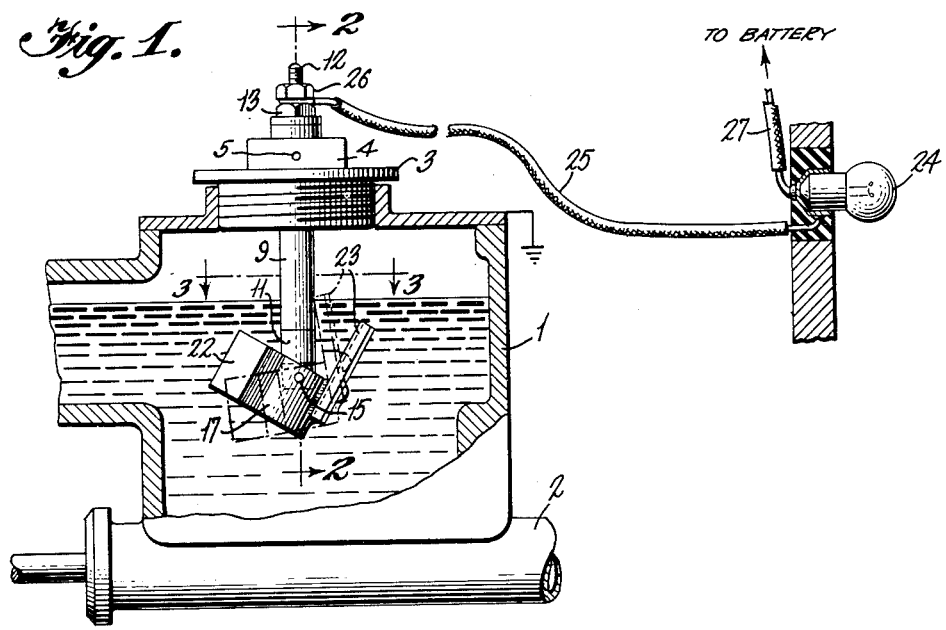
Figure 1 is a vertical section, part being shown in elevation of a brake cylinder reservoir in which is installed an embodiment of the present invention.
Figure 3:
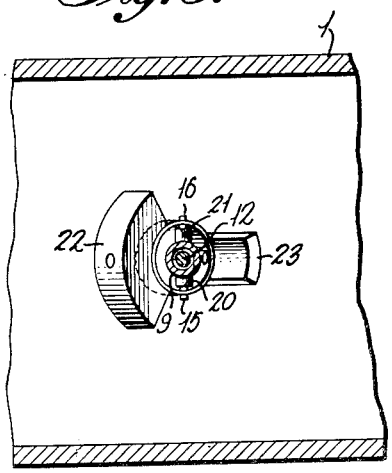
Figure 3 is a horizontal section taken on the line 3—3 of Figure 1.
Figure 2:
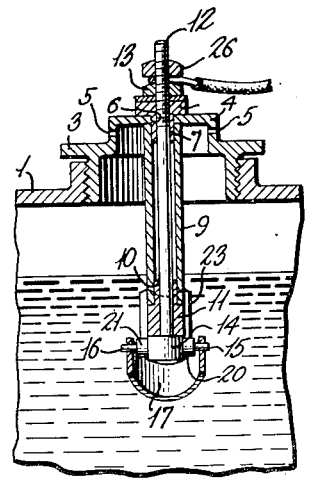
Figure 2 is a vertical transverse section through the upper portion of the reservoir, the switch and its support, taken on the line 2—2 of Figure 1.

Adverting now to the drawing and especially to Figures 1 and 2, there is shown a reservoir 1 for the master brake cylinder on an automobile. The filler cap 3 is in the form of a screw threaded plug having cast integral with it a nut portion 4, and drilled therethrough a breather hole 5. This is the usual equipment found on automobiles and the usual access which is provided for refilling the reservoir when needed.

Applicant's invention, as it is applied as a low fluid level warning system for the brake fluid reservoir on automobiles envisions the use of the filler cap as a means of support for the electrical signal actuator. A hole is drilled in the filler cap as at 6 through which is inserted a sleeve 7 of insulating material having a flange 8 to rest on the top of the filler cap. Sleeve 7 extends through the cap, and snugly fits inside of a length of metal tubing 9. Another insulating sleeve 10, having a much thicker flange portion 11, is inserted in the bottom of tube 9, and a bolt 12 is inserted through the assembled filler cap, insulating sleeves and metal tubing with the nut receiving end of the bolt extending beyond the top of the filler cap, and the whole made fast by tightening nut 13 on bolt 12. Due to this construction, the cylindrical head 14 of bolt 12 is suspended from the filler cap and positioned some distance therebelow, and the bolt is insulated from the filler cap and the metal tubing, and consequently from the ground of the electrical system of the automobile.

Figure 4:
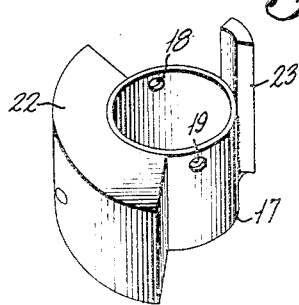
Figure 4 is a perspective view of the balance for actuating the electric switch of the present invention.
Figure 5:
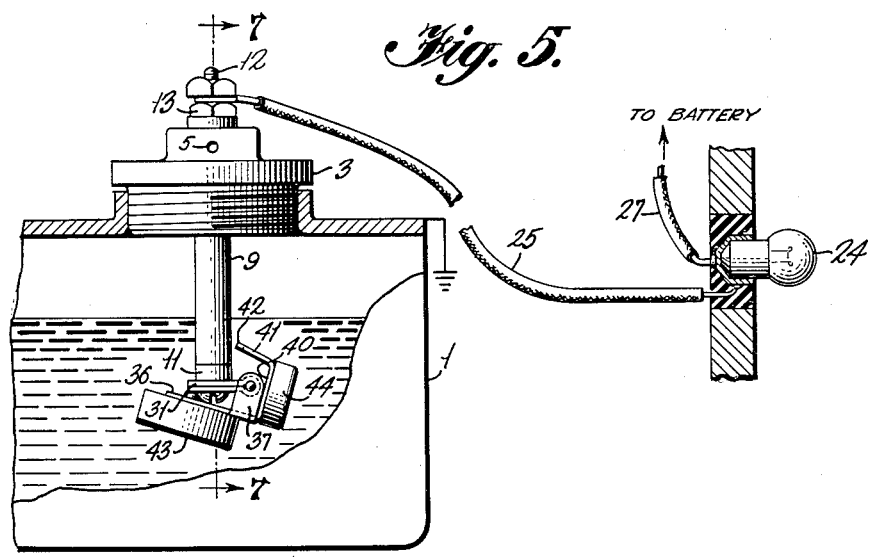
Figure 5 is a view similar to Figure 1, illustrating another embodiment of the present invention.
Figure 6:
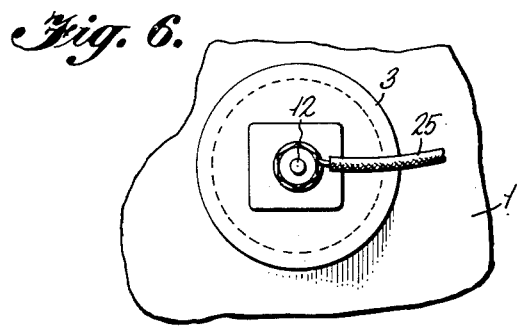
Figure 6 is a fragmentary plan view of a portion of the reservoir and its cap.
Figure 7:
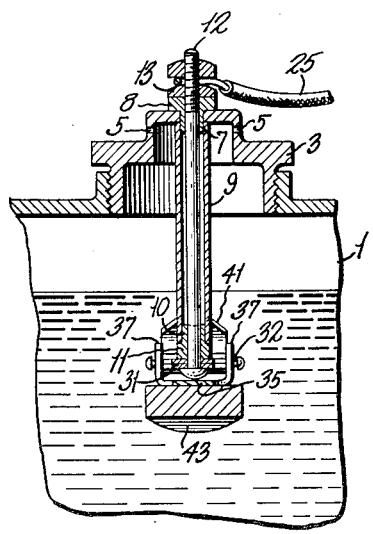
Figure 7 is a section taken on the line 7—7 of Figure 5.
Figure 8:
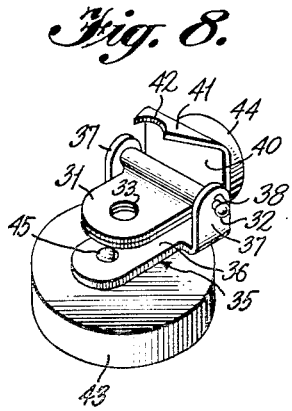
Figure 8 is a perspective view of the balance of the embodiment of the invention shown in Figure 5.

On bolt head 14, there is provided a pair of oppositely disposed trunnions 15 and 16, on which is journaled a lever 17. Lever 17 is shown in the form of a ring having bearings at 18 and 19, which, it will be readily seen makes a very sturdy type of lever. Shoulders 20 and 21 are provided for trunnions 15 and 16 respectively, to reduce friction and prevent side play in the movement of lever 17. Weight 22 and contact 23, of solid material which will not float in brake fluid, are fixedly attached to lever 17, being oppositely disposed on either side of the pivot axis and at 90° thereto. Weight 22 is made from a material having a specific gravity relative to brake fluid less than the material of which contact 23 is composed. The weight in air of weight 22 is slightly greater than the weight in air of contact 23. In order that the pivots or fulcrum of lever 17 may be at the longitudinal center point of the lever, contact 23 is made upstanding, as shown in Figure 4, so as to extend appreciably above lever 17 so it can serve as the arm of an electric contact switch. The arm should be long enough to span the exposed flange 11 of insulator sleeve 10 to contact the tube 9 when the lever 17 is out of fluid.

Bolt 12 and its pivots 15 and 16, lever arm 17 and contact arm 23 form part of an electrical circuit, to be described, and therefore should be made of a good electrical conductor, as for instance brass. Weight 22 may be made of aluminum which is of less specific gravity than brass.

It will be seen from the above that the balance lever 17, its weight 22 and contact arm can form the actuator and movable element of a switch, the contact arm 23 making and breaking contact with the tube 9. To incorporate this mechanism in an electric warning system, it is only necessary to connect the bolt 12 to one post of a lamp 24 by means of wire 25 secured on bolt 12 by nut 26, and to connect the other post of the lamp to a battery (not shown) by wire 27. The battery and reservoir 1 will be grounded to complete the circuit. When contact arm 23 makes contact with tube 9, the lamp 24 will glow, and the lamp will be out when the arm 23 leaves the tube 9.

In using the device, the filler cap is placed upon the filler opening after the reservoir has been filled with brake fluid to the required level. It will be noted that the balance lever 17 with its weight and contact arm are substantially centrally disposed with respect to the supporting tube 9. This permits the assembly to slip easily through the filler opening. The fact that no extensive leverage is necessary with the novel actuator used makes possible a very compact unit which may be inserted into a reservoir having but a very small filler opening.

When the device is installed and the electric connections made as described, the device is ready for service. As the reservoir has been filled to the proper level, the contacting arm including the weight 22 and at least the lower part of contact arm 23 will be immersed in the fluid. The specific gravity of the weight 22 is so much less than that of the contact arm 23 that the contact arm 23, being the heavier material in liquid, will overbalance the weight 22 and tilt the lever, thus breaking contact with tube 9. As the fluid level falls during operation of the vehicle, more and more of the weight 22 will be out of the liquid. Finally, so much of the weight 22 will be above the liquid level that this weight, due to the fact that it is heavier in air than contact 23, will overbalance the contact arm, tilting lever 17 and causing contact arm 23 to contact tube 9. This will close the circuit through the lamp 24 causing it to glow and warn the operator that the reserve supply of brake fluid is dangerously low. When the fluid supply is replenished and the filler cap again put in place the balance of lever 17 will again be upset and the circuit through the lamp broken.

The embodiment of the invention shown in Figures 5, 6, 7 and 8 lends itself particularly to ease of manufacture. The principle of operation is the same, but by making a few changes in the balance lever portion of the structure, manufacture is facilitated. Thus, in Figures 5 and 7, in particular, it will be seen that the threaded filler cap 3, insulated sleeve 7, metal tubing 9, insulated sleeve 10, and the securing bolt 12 are substantially the same as in the form just described. In this form, however, offset pivot holder 31, which is formed by bending a piece of metal back on itself after inserting pivot pin 32 at the bend and drilling a hole in the opposite end as at 33, fits on the bolt 12 and is secured between the head of the bolt and the sleeve 10. To assemble the parts mentioned above, offset pivot holder 31 is first threaded on bolt 12, and bolt 12 is threaded through the insulated sleeves 7 and 10, metal tubing 9 and filler cap 3, bolt 12 extending beyond flange 8 and the whole being securely fastened by nut 13. The balance lever 35 is conveniently made of sheet metal, preferably a metal which is a good conductor of electricity, having one horizontally extended lever arm 36, oppositely disposed upstanding ears 37 drilled as at 38 to provide means for swingably journalling balance lever 35 to offset pivot holder 31 by means of pivot pin 32. The other arm of balance lever 35 is abruptly turned upward to form lever arm 40 and then turned forward at a right angle to form contact 41 to bridge the gap formed by insulated sleeve flange 11. Contact point 42 has the reverse contour of tube 9 to make a good electrical contact with the tube.

Weight 43 is made of aluminum or other low specific gravity material; it is solid but has a specific gravity greater than the medium in which it is to be used. Weight 43 is attached to the outer side of arm 36. Weight 44 is made of lead, brass or other material having a greater specific gravity than weight 43 and is attached to the outer side of arm 40. These weights are circular disks which may be conveniently cut from rods of the respective materials. The mechanical advantage of the leverage favors weight 43 in air. Weight 43 may be attached by means of rivet 45 which extends through the center of the disk and is fastened near the end of the lever arm 36 away from the fulcrum of pivot 38. Weight 44 may be similarly attached. Thus when the balance lever with its weights is out of fluid, weight 43 balances downward and holds contact point 42 against the metal tubing 9 to complete the circuit through the warning light; and when the reservoir is filled, weight 44 being the heavier in fluid balances contact point 42 away from tubing 9 to break the circuit to the warning light.

Thus, it will be seen that there has been provided a sturdy and reliable switch which is operable upon the rise and fall of a fluid level, and does not depend upon the use of floats. It will readily be seen also that similarly useful devices may be contrived using the principles of this invention as set forth in the appended claims.

What is claimed is:

1. A fluid controlled switch arm comprising, a support, a lever pivoted intermediate its ends upon said support, a solid non-floatable weight carried at one end of said lever and a solid non-floatable contact arm weight at the other end of said lever, said weight being heavier than said contact arm weight in air to overbalance said lever and tilt it downward on the weight side when said weight and contact arm weight are not immersed in fluid, said weight being of a less specific gravity than said contact arm weight with respect to the fluid with which the device is to be used, whereby said contact arm weight will overbalance said lever and tilt it downward on the contact arm weight side when the weight and contact arm weight are immersed in fluid, said lever having arms at either side of the pivotal connection angularly disposed with relation to one another, and said weight and said contact arm weight being in the form of disks secured to said arms.

2. A fluid controlled switch comprising, a support, a fixed contact adjacent said support, a lever pivotally connected to said support, a solid non-floatable weight carried at one end of said lever, and a solid non-floatable contact arm weight at the other end of said lever, said weight being heavier than said contact arm weight in air to overbalance said lever and tilt it downward on the weight side when said weight and contact arm weight are not immersed in fluid, said weight being of a less specific gravity with respect to the fluid with which the device is to be used than said contact arm weight, whereby said contact arm weight will overbalance said lever and tilt it downward on the contact arm weight side when the weight and the contact arm weight are immersed in fluid.

3. A fluid controlled switch arm as claimed in claim 2, said support being tubular and having diametrically opposed trunnions, and said lever arm being in the form of a ring of larger diameter than said support.

4. A fluid controlled switch arm as claimed in claim 2, said lever having arms at either side of the pivotal connection angularly disposed with relation to one another, and said weight and said contact arm weight being in the form of disks secured to said arms.

MAX T. RICHARDS.

REFERENCES CITED

The following references are of record in the file of this patent:

UNITED STATES PATENTS

| Number | Name | Date |
| --- | --- | --- |
| 1,704,761 | Plant | Mar. 12, 1923 |